US011398724B1

(12) United States Patent
Yang (10) Patent No.: US 11,398,724 B1
(45) Date of Patent: Jul. 26, 2022

(54) SOLID-STATE CIRCUIT BREAKER CONFIGURED TO DISCHARGE AND DISSIPATE RECOVERY VOLTAGE

(71) Applicant: Siemens Industry, Inc., Alpharetta, GA (US)

(72) Inventor: Guang Yang, Johns Creek, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 17/227,865

(22) Filed: Apr. 28, 2021

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ...... H01H 71/123; H02H 1/00; H02H 1/0007; H02H 1/0015; H02H 3/06; H02H 3/066; H02H 3/10; H02H 3/20; H02H 3/205; H02H 3/207; H02H 3/38; H02H 7/222; H02H 9/02; H02H 9/04
See application file for complete search history.

(56) References Cited

U.S. PATENT DOCUMENTS

| | | | | |
|---|---|---|---|---|
| 2020/0036181 | A1* | 1/2020 | Tseng | H02H 3/207 |
| 2020/0106260 | A1* | 4/2020 | Telefus | H02H 3/10 |
| 2020/0365345 | A1* | 11/2020 | Telefus | H01H 71/24 |
| 2020/0365346 | A1* | 11/2020 | Telefus | H02H 1/0092 |
| 2020/0365356 | A1* | 11/2020 | Telefus | H01H 9/542 |
| 2020/0366079 | A1* | 11/2020 | Telefus | H01H 71/04 |
| 2021/0066013 | A1* | 3/2021 | Kumar | H01H 71/123 |
| 2021/0126447 | A1* | 4/2021 | Miller | H02H 3/044 |
| 2021/0226437 | A1* | 7/2021 | Lichauer | H02H 3/05 |

* cited by examiner

*Primary Examiner* — Jared Fureman
*Assistant Examiner* — Nicolas Bellido (57) ABSTRACT

A solid-state circuit breaker comprises a solid-state device configured between line-in and line-out terminals, an air-gap forming apparatus coupled in series with the solid-state device to complete a current conducting path and a sensing and control unit to control a gate of the solid-state device. It further comprises a first switching component coupled in series with an actuator coil across a connection point after an air gap and a neutral such that the sensing and control unit to control a gate of the first switching component. It further comprises a second switching component coupled between the line-out terminal and a terminal between the actuator coil and the first switching component such that the sensing and control unit to control a gate of the second switching component. The actuator coil is configured to discharge and dissipate a recovery voltage associated therewith an inductive load.

20 Claims, 4 Drawing Sheets

SOLID-STATE CIRCUIT BREAKER CONFIGURED TO DISCHARGE AND DISSIPATE RECOVERY VOLTAGE

BACKGROUND

1. Field

Aspects of the present invention generally relate to a solid-state circuit breaker configured to discharge and dissipate a recovery voltage associated therewith an inductive load.

2. Description of the Related Art

Circuit breakers are essential for electrical safeties. They feed current to loads that are connected to them and interrupt a circuit once a circuit fault, such as overload, short circuit, ground fault and arc fault, is detected. Recently, solid state switching technology has attracted much attention in circuit breaker applications. In a solid-state circuit breaker, main solid-state components are put in series with an air gap to complete the current conducting path. The main solid-state components are normally MOSFETs or IGBTs or similar power electronics components. A sensing and control unit is used to control a gate of the main solid-state components. Once a fault is detected, the sensing and control unit turns off the gate of main solid-state components, and after a short delay, it turns on the gate of a switching component (e.g., TRIAC or SCR) and allows current to flow through an actuator. The actuator is normally in the form of a coil driven device such as a solenoid or an electromagnet. The actuator then opens the air gap to complete the interruption of a fault. When turning on, the air gap is closed first to start the sensing and control unit, which in turn turns on the gate of main solid-state components to allow current flow.

Solid-state circuit breakers as described above have advantages over traditional mechanical circuit breakers, such as fast switching speed, minimum arcing, less moving parts and so on. However, some issues also arise with the advantages of solid-state switching. One issue is switching off highly inductive load. Because of the fast switching speed, an inductive load generates high recovery voltage back to the solid-state circuit breaker. If not handled properly, the high recovery voltage may damage the solid-state components. A way to discharge the high recovery voltage that can fit into small residential style circuit breakers is needed.

To handle the high recovery voltage, suppressing components such as MOV and TVS can be used. The turning on threshold of such component is selected to be lower than the max voltage withstands the solid-state component with safety margin. If recovery voltage if higher than the turning on threshold of suppressing components, the recovery voltage is discharged through them, and does not damage the solid-state components. Suppressing components are also used directly across main solid-state components. The drawback of such suppressing components is that they degrade from use to use, so they cannot repetitively daily used as required in residential applications.

To solve the problem of limited usage, a capacitor can be used in the place of suppressing components. In this case, the capacitor and the inductive load form a circuit that allows the recovery voltage to discharge and dissipate. The drawback of the capacitor approach is that to handle various loads the capacitor needs to have high capacitance, voltage rating and current rating. And such capacitors are normally large in physical size so do not fit into the small form factor of residential circuit breakers.

Therefore, there is a need for a simplified design which enables a solid-state circuit breaker to safely discharge high recovery voltage generated by an inductive load.

SUMMARY

Briefly described, aspects of the present invention relate to a simplified design which enables a solid-state circuit breaker to safely discharge high recovery voltage generated by an inductive load. This invention presents a way to discharge the high recovery voltage that can fit into small residential style circuit breakers. To create a solution of a recovery voltage for the residential applications, an actuator coil is used to discharge and dissipate the recovery voltage. A second switching component, such as TRIAC, SCR or MOSFET is added to a first switching component. During switching OFF, a gate of the second switching component is turned ON at the same time as a gate of main power solid-state components is turned OFF. When the recovery voltage occurs, it can discharge through a current path that comprises of the second switching component and the actuator coil.

In accordance with one illustrative embodiment of the present invention, a solid-state circuit breaker is configured to feed current to an inductive load having a recovery voltage associated therewith. The solid-state circuit breaker comprises line-in and line-out terminals, a solid-state device configured between the line-in and line-out terminals, an air-gap forming apparatus between the line-in and line-out terminals and coupled in series with the solid-state device to complete a current conducting path and a sensing and control unit provided across a connection point after an air gap and a neutral to control a gate of the solid-state device. It further comprises a first switching component coupled in series with an actuator coil across the connection point after the air gap and the neutral such that the sensing and control unit to control a gate of the first switching component. It further comprises a second switching component coupled between the line-out terminal and a terminal between the actuator coil and the first switching component such that the sensing and control unit to control a gate of the second switching component. The actuator coil is configured to discharge and dissipate the recovery voltage.

In accordance with one illustrative embodiment of the present invention, a method for feeding current to an inductive load having a recovery voltage associated therewith. The method comprises providing line-in and line-out terminals, providing a solid-state device configured between the line-in and line-out terminals, providing an air-gap forming apparatus between the line-in and line-out terminals and coupled in series with the solid-state device to complete a current conducting path and providing a sensing and control unit across a connection point after an air gap and a neutral to control a gate of the solid-state device. The method further comprises providing a first switching component coupled in series with an actuator coil across the connection point after the air gap and the neutral such that the sensing and control unit to control a gate of the first switching component. The method further comprises providing a second switching component coupled between the line-out terminal and a terminal between the actuator coil and the first switching component such that the sensing and control unit to control a gate of the second switching component. The actuator coil is configured to discharge and dissipate the recovery voltage.

DETAILED DESCRIPTION

To facilitate an understanding of embodiments, principles, and features of the present invention, they are explained hereinafter with reference to implementation in illustrative embodiments. In particular, they are described in the context of a solid-state circuit breaker including an actuator coil and a second switching component in addition with a capacitor or a suppressing component that are configured to safely discharge and dissipate a high recovery voltage generated by an inductive load. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the solid-state circuit breaker having an actuator coil and a second switching component in addition with a capacitor or a suppressing component according to the present disclosure are described below with reference to FIGS. 1-4 herein. Like reference numerals used in the drawings identify similar or identical elements throughout the several views. The drawings are not necessarily drawn to scale.

Figure 1:
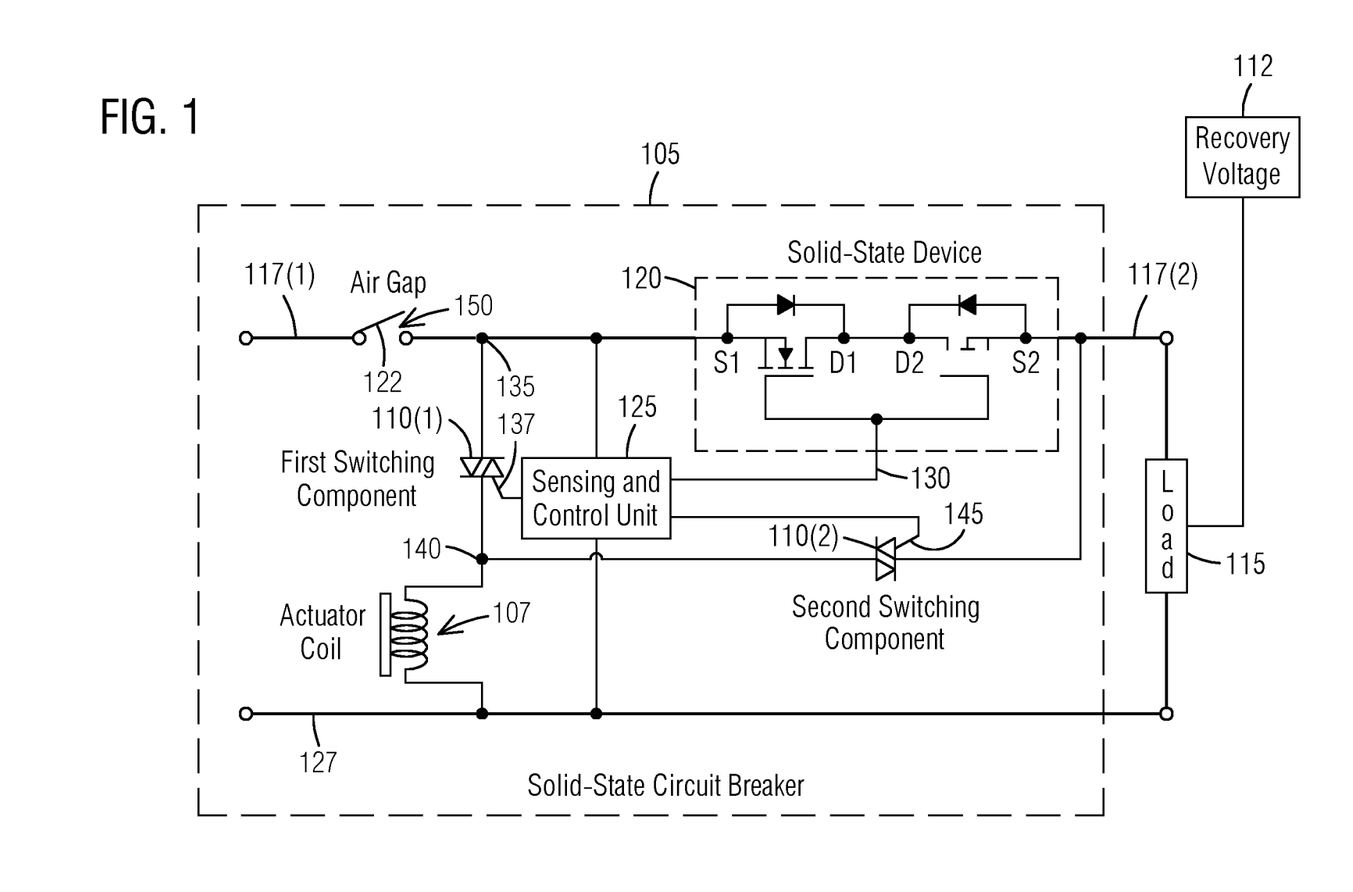
FIG. 1 illustrates a schematic of a solid-state circuit breaker including an actuator coil and a second switching component to discharge and dissipate a recovery voltage associated with an inductive load in accordance with an exemplary embodiment of the present invention.

Consistent with one embodiment of the present invention, FIG. 1 represents a perspective view of a solid-state circuit breaker 105 in accordance with an exemplary embodiment of the present invention. The solid-state circuit breaker 105 works by replacing the traditional moving parts of an electromechanical circuit breaker with power electronics and advanced software algorithms that control the power and can interrupt extreme currents faster than ever before.

Solid-state circuit breakers (SSCBs) are power semiconductor-based protection apparatuses, with no moving parts for fault current interruption. The response time of semiconductor devices is several orders of magnitude shorter than that of the electromechanical mechanisms typical of conventional circuit breakers. Second, unlike electromechanical circuit breakers, which rely on contact separation for current interruption, semiconductor devices can interrupt the flow of electrical charges without arcing. Moreover, thanks to the extremely quick current interruption capability, semiconductor-based circuit breakers can limit the let-through energy and arc hazard exposure in the event of a fault by multiple orders of magnitude. Furthermore, because of the absence of moving parts, power semiconductor devices can execute a much higher number of operations. This translates into a greatly increased lifetime for circuit breakers. Finally, because semiconductor devices have no moving parts, they operate without making any noise. On top of the aforementioned benefits that are true for most power distribution applications, semiconductor-based circuit breakers offer several additional benefits that may be application-specific.

The solid-state circuit breaker 105, as shown in FIG. 1, has advantages over traditional mechanical circuit breakers such as fast switching speed, minimum arcing, less moving parts etc. However, some issues also arise with the advantages of solid-state switching. One issue is switching off highly inductive load. Because of the fast switching speed, the inductive load generates high recovery voltage back to the solid-state circuit breaker 105. If not handled properly, the high recovery voltage may damage the solid-state components. This invention presents a way to discharge the high recovery voltage that can fit into small residential style circuit breakers.

In FIG. 1, the solid-state circuit breaker 105 includes an actuator coil 107 and a second switching component 110(2) to discharge and dissipate a recovery voltage 112 associated with an inductive load 115 in accordance with an exemplary embodiment of the present invention. In one embodiment, the second switching component 110(2) is a triode for alternating current (TRIAC), a silicon-controlled rectifier (SCR) or a metal-oxide-semiconductor field-effect transistor (MOSFET).

The solid-state circuit breaker 105 is configured to feed current to the inductive load 115. The solid-state circuit breaker 105 comprises line-in and line-out terminals 117(1-2). When the recovery voltage 112 occurs, it is configured to discharge through a current path that comprises the second switching component 110(2) and the actuator coil 107. In one embodiment, the second switching component 110(2) is optional.

The solid-state circuit breaker 105 further comprises a solid-state device 120 configured between the line-in and line-out terminals 117(1-2). The solid-state circuit breaker 105 further comprises an air-gap forming apparatus 122 between the line-in and line-out terminals 117(1-2) and coupled in series with the solid-state device 120 to complete a current conducting path. The solid-state circuit breaker 105 further comprises a sensing and control unit 125 that is provided across a connection point 135 after an air gap and a neutral 127 to control a gate 130 of the solid-state device 120. The solid-state circuit breaker 105 further comprises a first switching component 110(1) coupled in series with the actuator coil 107 across the connection point 135 after an air gap formed by the air-gap forming apparatus 122 and the neutral 127 such that the sensing and control unit 125 to control a gate 137 of the first switching component 110(1). In one embodiment, the first switching component 110(1) is a triode for alternating current (TRIAC), a silicon-controlled rectifier (SCR) or a metal-oxide-semiconductor field-effect transistor (MOSFET).

The solid-state circuit breaker 105 further comprises the second switching component 110(2) coupled between the line-out terminal 117(2) and a terminal 140 between the actuator coil 107 and the first switching component 110(1) such that the sensing and control unit 125 to control a gate 145 of the second switching component 110(2). The actuator coil 107 is configured to discharge and dissipate the recovery voltage 112.

In operation, during switching OFF, the gate 145 of the second switching component 110(2) is turned ON at the same time as the gate 130 of the solid-state device 120 is turned OFF. A recovery current from the recovery voltage 112 is high enough to allow the actuator coil 107 to open an air gap 150 via the air-gap forming apparatus 122. In case the recovery current is not high enough to open the air gap, the first switching component 110(1) is still turned ON after a short delay and the air gap will be open.

To create a solution of a recovery voltage for the residential applications, the actuator coil 107 is used to discharge and dissipate the recovery voltage 112. The second switching component 110(2), such as TRIAC, SCR or MOSFET is added to the first switching component 110(1). During switching OFF, the gate 145 of the second switching component 110(2) is turned ON at the same time as the gate 130 of the solid-state device 120 is turned OFF. When the recovery voltage 112 occurs, it can discharge through a current path that comprises of the second switching component 110(2) and the actuator coil 107.

Figure 3:
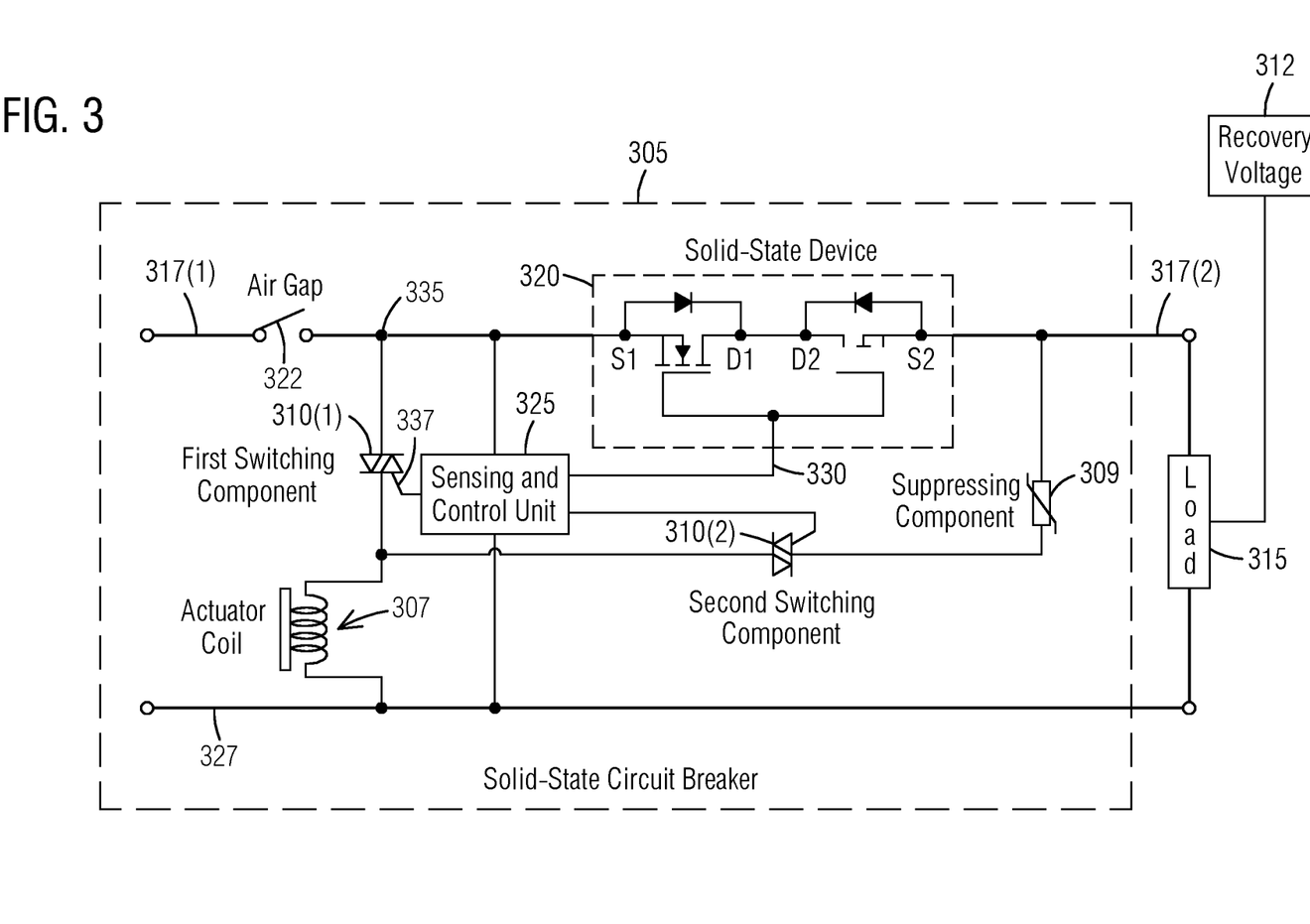
FIG. 3 illustrates a schematic of a solid-state circuit breaker including an actuator coil and a suppressing component to discharge and dissipate a recovery voltage associated with an inductive load in accordance with an exemplary embodiment of the present invention.

In contrast to the suppressing components as shown in FIG. 3, the actuator coil 107 don't degrade with usage, and hence can handle frequent usage as required in residential applications. Also, although it is large in physical size, the actuator coil 107 is already a component in the breaker 105. Therefore, it doesn't take any additional spaces as the capacitors do, and still allows small form factor as required in residential applications. It needs to be mentioned that the current from the recovery voltage may be high enough to allow the actuator to open the air gap. In case the recovery current is not high enough to open the air gap, the first switching component 110(1) is still turned ON after a short delay as explained previously and the air gap will be open.

To handle a high recovery voltage, suppressing components such as a metal-oxide varistor (MOV) and a transient-voltage-suppression (TVS) diode can be used. The turning ON threshold of such component is selected to be lower than the max voltage withstand of a solid-state component with a safety margin. If the recovery voltage is higher than the turning ON threshold of suppressing components, the recovery voltage is discharged through them and does not damage the solid-state components. Suppressing components are also used directly across main solid-state components. The drawback of such suppressing components is that they degrade from use to use so they cannot be repetitively daily used as required in residential applications.

To solve the problem of limited usage, a capacitor can be used in the place of suppressing components. In this case, the capacitor and the inductive load form a circuit that allows the recovery voltage to discharge and dissipate. The drawback of the capacitor approach is that to handle various loads the capacitor needs to have high capacitance, voltage rating and current rating. And such capacitors are normally large in physical size so do not fit into the small form factor of residential circuit breakers.

Figure 2:
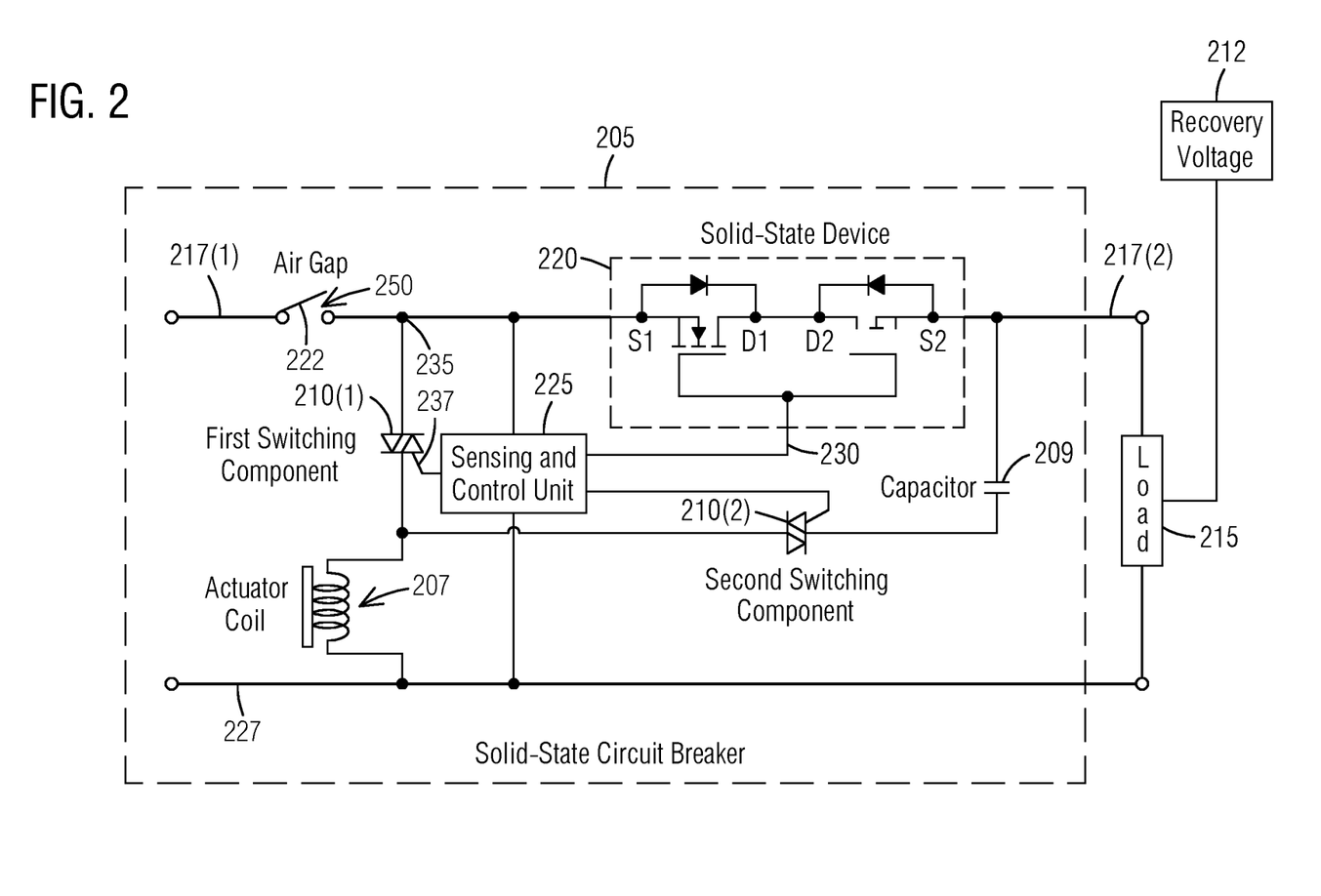
FIG. 2 illustrates a schematic of a solid-state circuit breaker including an actuator coil and a capacitor to discharge and dissipate a recovery voltage associated with an inductive load in accordance with an exemplary embodiment of the present invention.

Referring to FIG. 2, it illustrates a schematic of a solid-state circuit breaker 205 including an actuator coil 207 and a capacitor 209 to discharge and dissipate a recovery voltage 212 associated with an inductive load 215 in accordance with an exemplary embodiment of the present invention. The actuator coil 207 is used in combination with one or more capacitors in parallel or in series to best match with loads. In this case, the capacitor 209 does not need to be as big as if using capacitors alone, because the actuator coil 207 can work as dissipation component. One example is shown in FIG. 2, and in this case, a second switching component 210(2) is optional.

The solid-state circuit breaker 205 further comprises a solid-state device 220 configured between the line-in and line-out terminals 217(1-2). The solid-state circuit breaker 205 further comprises an air-gap forming apparatus 222 between the line-in and line-out terminals 217(1-2) and coupled in series with the solid-state device 220 to complete a current conducting path. The solid-state circuit breaker 205 further comprises a sensing and control unit 225 that is provided across the line-in, line-out terminals 217(1-2) and a neutral 227 to control a gate 230 of the solid-state device 220. The solid-state circuit breaker 205 further comprises a first switching component 210(1) coupled in series with the actuator coil 207 across a connection point 235 after an air gap 250 formed by the air-gap forming apparatus 222 and the neutral 227 such that the sensing and control unit 225 to control a gate 237 of the first switching component 210(1).

Turning now to FIG. 3, it illustrates a schematic of a solid-state circuit breaker 305 including an actuator coil 307 and a suppressing component 309 to discharge and dissipate a recovery voltage 312 associated with an inductive load 315 in accordance with an exemplary embodiment of the present invention. The actuator coil 307 is used in combination with the suppressing component 309 such as a metal-oxide varistor (MOV) and a transient-voltage-suppression (TVS) diode. In this case, the turn ON threshold of the suppression component 309 can be selected as high as possible in order to provide extra protection under surge type abnormal conditions. In normal use with the inductive load 315, the actuator coil 307 handles the recovery voltage as described above.

The solid-state circuit breaker 305 further comprises a solid-state device 320 configured between the line-in and line-out terminals 317(1-2). The solid-state circuit breaker 305 further comprises an air-gap forming apparatus 322 between the line-in and line-out terminals 317(1-2) and coupled in series with the solid-state device 320 to complete a current conducting path. The solid-state circuit breaker 305 further comprises a sensing and control unit 325 that is provided across the line-in, line-out terminals 317(1-2) and a neutral 327 to control a gate 330 of the solid-state device 320. The solid-state circuit breaker 305 further comprises a first switching component 310(1) coupled in series with the actuator coil 307 across a connection point 335 after an air gap formed by the air-gap forming apparatus 322 and the neutral 327 such that the sensing and control unit 325 to control a gate 337 of the first switching component 310(1). The solid-state circuit breaker 305 further comprises a second switching component 310(2) coupled between the line-out terminal 317(2) and a terminal 340 between the actuator coil 307 and the first switching component 310(1).

This invention uses existing large and sturdy component that is already in the breaker instead of adding other large components. Therefore, it can fit into smaller form factors such as residential.

Figure 4:
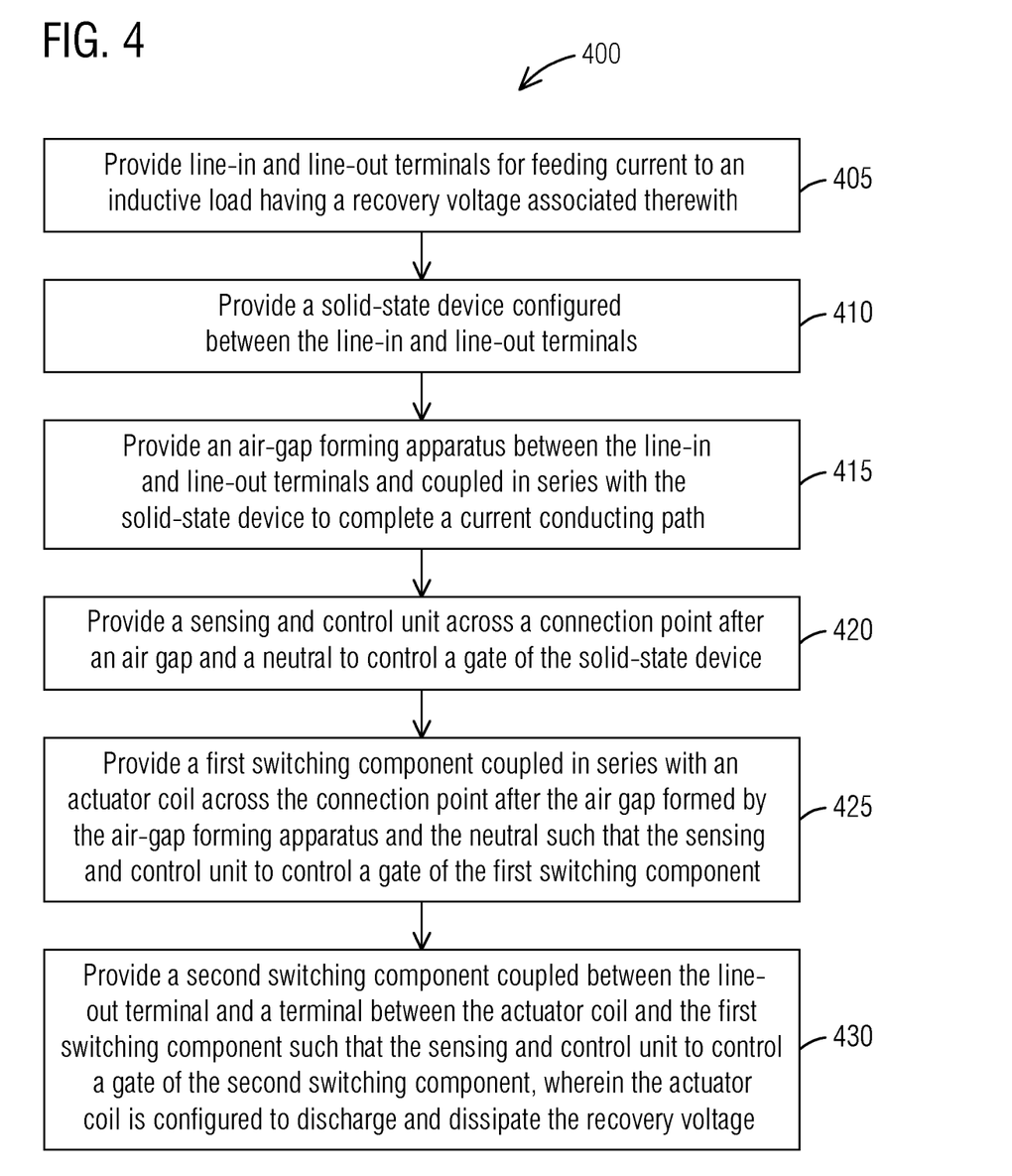
FIG. 4 illustrates a schematic view of a flow chart of a method of discharging and dissipating a recovery voltage in a solid-state circuit breaker with an inductive load in accordance with an exemplary embodiment of the present invention.

FIG. 4 illustrates a schematic view of a flow chart of a method of discharging and dissipating a recovery voltage in a solid-state circuit breaker with an inductive load in accordance with an exemplary embodiment of the present invention. Reference is made to the elements and features described in FIGS. 1-3. It should be appreciated that some steps are not required to be performed in any particular order, and that some steps are optional.

The method 400 comprises a step 405 of providing line-in and line-out terminals for feeding current to an inductive load having a recovery voltage associated therewith. The method 400 further comprises a step 410 of providing a solid-state device configured between the line-in and line-out terminals. The method 400 further comprises a step 415 of providing an air-gap forming apparatus between the line-in and line-out terminals and coupled in series with the solid-state device to complete a current conducting path. The method 400 further comprises a step 420 of providing a sensing and control unit is provided across the line-in, line-out terminals and a neutral to control a gate of the solid-state device. The method 400 further comprises a step 425 of providing a first switching component coupled in series with an actuator coil across a connection point after an air gap formed by the air-gap forming apparatus and the neutral such that the sensing and control unit to control a gate of the first switching component. The method 400 further comprises a step 430 of providing a second switching component coupled between a line-out terminal and a terminal between the actuator coil and the first switching component such that the sensing and control unit to control a gate of the second switching component. The actuator coil is configured to discharge and dissipate the recovery voltage.

While a triode for alternating current (TRIAC) based first and second switching components are described here a range of one or more other switching components or other forms of switching components are also contemplated by the present invention. For example, other types of switching components may be implemented based on one or more features presented above without deviating from the spirit of the present invention.

The techniques described herein can be particularly useful for 2 metal-oxide-semiconductor field-effect transistors (MOSFETs) and 2 diodes based solid-state device. While particular embodiments are described in terms of these main power solid state components, the techniques described herein are not limited to such a structure but can also be used with other solid-state components.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A solid-state circuit breaker configured to feed current to an inductive load having a recovery voltage associated therewith, the solid-state circuit breaker comprising:
   line-in and line-out terminals;
   a solid-state device configured between the line-in and line-out terminals;
   an air-gap forming apparatus between the line-in and line-out terminals and coupled in series with the solid-state device to complete a current conducting path;
   a sensing and control unit provided across a connection point after an air gap and a neutral to control a gate of the solid-state device;
   a first switching component coupled in series with an actuator coil across the connection point after the air gap and the neutral such that the sensing and control unit to control a gate of the first switching component; and
   a second switching component coupled between the line-out terminal and a terminal between the actuator coil and the first switching component such that the sensing and control unit to control a gate of the second switching component, wherein the actuator coil is configured to discharge and dissipate the recovery voltage.

2. The solid-state circuit breaker of claim 1, wherein the first switching component is a triode for alternating current (TRIAC), a silicon-controlled rectifier (SCR) or a metal-oxide-semiconductor field-effect transistor (MOSFET).

3. The solid-state circuit breaker of claim 2, wherein the second switching component is a triode for alternating current (TRIAC), a silicon-controlled rectifier (SCR) or a metal-oxide-semiconductor field-effect transistor (MOSFET).

4. The solid-state circuit breaker of claim 1, wherein, during switching OFF, the gate of the second switching component is turned ON at the same time as the gate of the solid-state device is turned OFF.

5. The solid-state circuit breaker of claim 4, wherein when the recovery voltage occurs it is configured to discharge through a current path that comprises the second switching component and the actuator coil.

6. The solid-state circuit breaker of claim 5, wherein a recovery current from the recovery voltage is high enough to allow the actuator coil to open an air gap via the air-gap forming apparatus.

7. The solid-state circuit breaker of claim 6, wherein in case the recovery current is not high enough to open the air gap, the first switching component is still turned ON after a short delay and the air gap will be open.

8. The solid-state circuit breaker of claim 1, wherein the actuator coil is used in combination with one or more capacitors in parallel or in series to best match with loads.

9. The solid-state circuit breaker of claim 1, wherein the second switching component is optional.

10. The solid-state circuit breaker of claim 1, wherein the actuator coil is used in combination with a suppressing component including a metal-oxide varistor (MOV) and a transient-voltage-suppression (TVS) diode.

11. A method for feeding current to an inductive load having a recovery voltage associated therewith, the method comprising:
   providing line-in and line-out terminals;
   providing a solid-state device configured between the line-in and line-out terminals;
   providing an air-gap forming apparatus between the line-in and line-out terminals and coupled in series with the solid-state device to complete a current conducting path;
   providing a sensing and control unit across a connection point after an air gap and a neutral to control a gate of the solid-state device;
   providing a first switching component coupled in series with an actuator coil across the connection point after the air gap and the neutral such that the sensing and control unit to control a gate of the first switching component; and
   providing a second switching component coupled between the line-out terminal and a terminal between the actuator coil and the first switching component such that the sensing and control unit to control a gate of the second switching component, wherein the actuator coil is configured to discharge and dissipate the recovery voltage.

12. The method of claim 11, wherein the first switching component is a triode for alternating current (TRIAC), a silicon-controlled rectifier (SCR) or a metal-oxide-semiconductor field-effect transistor (MOSFET).

13. The method of claim 12, wherein the second switching component is a triode for alternating current (TRIAC), a silicon-controlled rectifier (SCR) or a metal-oxide-semiconductor field-effect transistor (MOSFET).

14. The method of claim 11, wherein, during switching OFF, the gate of the second switching component is turned ON at the same time as the gate of the solid-state device is turned OFF.

15. The method of claim 14, wherein when the recovery voltage occurs it is configured to discharge through a current path that comprises the second switching component and the actuator coil.

16. The method of claim 15, wherein a recovery current from the recovery voltage is high enough to allow the actuator coil to open an air gap via the air-gap forming apparatus.

17. The method of claim 16, wherein in case the recovery current is not high enough to open the air gap, the first switching component is still turned ON after a short delay and the air gap will be open.

18. The method of claim 11, wherein the actuator coil is used in combination with one or more capacitors in parallel or in series to best match with loads.

19. The method of claim 11, wherein the second switching component is optional.

20. The method of claim 11, wherein the actuator coil is used in combination with a suppressing component including a metal-oxide varistor (MOV) and a transient-voltage-suppression (TVS) diode.

* * * * *